(12) United States Patent
Yang et al.

(10) Patent No.: US 11,948,384 B2
(45) Date of Patent: Apr. 2, 2024

(54) SYSTEMS AND METHODS FOR READING FLAT CARDS

(71) Applicant: Synchrony Bank, Stamford, CT (US)

(72) Inventors: Brian Yang, Stamford, CT (US);
Michael Storiale, Stamford, CT (US)

(73) Assignee: Synchrony Bank, Stamford, CT (US)

(*) Notice: Subject to any disclaimer, the term of this patent is extended or adjusted under 35 U.S.C. 154(b) by 102 days.

(21) Appl. No.: 17/478,058

(22) Filed: Sep. 17, 2021

(65) Prior Publication Data
US 2022/0092304 A1 Mar. 24, 2022

Related U.S. Application Data

(60) Provisional application No. 63/080,457, filed on Sep. 18, 2020.

(51) Int. Cl.
| | |
|---|---|
| *G06V 30/413* | (2022.01) |
| *G06N 20/00* | (2019.01) |
| *G06Q 20/34* | (2012.01) |
| *G06Q 20/38* | (2012.01) |
| *G06Q 20/40* | (2012.01) |
| *G06V 30/10* | (2022.01) |
| *G06V 30/224* | (2022.01) |

(52) U.S. Cl.
CPC .......... *G06V 30/413* (2022.01); *G06N 20/00* (2019.01); *G06Q 20/34* (2013.01); *G06Q 20/341* (2013.01); *G06Q 20/342* (2013.01); *G06Q 20/355* (2013.01); *G06Q 20/356* (2013.01); *G06Q 20/387* (2013.01); *G06Q 20/4014* (2013.01); *G06V 30/10* (2022.01); *G06V 30/224* (2022.01)

(58) Field of Classification Search
CPC .. G06Q 20/341; G06Q 20/342; G06Q 20/351; G06Q 20/355; G06Q 20/356; G06Q 20/387; G06Q 20/4014; G06N 20/00; G06V 30/10; G06V 30/413; G06V 10/82; G06V 30/224
See application file for complete search history.

(56) References Cited

U.S. PATENT DOCUMENTS

| | | | | |
|---|---|---|---|---|
| 2011/0238510 A1* | 9/2011 | Rowen | ................. | G06V 40/382 705/16 |
| 2016/0125251 A1* | 5/2016 | Kumar | ................. | G06Q 20/34 382/139 |
| 2020/0175094 A1* | 6/2020 | Palmer | ................. | G06F 16/353 |
| 2021/0201296 A1* | 7/2021 | Rule | ................. | G06Q 20/3829 |

* cited by examiner

*Primary Examiner* — Daniel G Mariam
(74) *Attorney, Agent, or Firm* — Polsinelli LLP

(57) ABSTRACT

The present disclosure is directed to systems and methods that enable scanning of any type of card regardless of the shape and design of a given card and/or a font, a shape and a format with which characters such as numbers, letters and symbols are printed on the cards including cards with non-embossed characters printed thereon. In one example, a method includes scanning a card, the card including at least an account number associated with a user of the card and an identifier of the user; detecting, by applying a machine learning model to the card after scanning the card, at least the account number printed on the card; and completing a task using the account number.

18 Claims, 6 Drawing Sheets

SYSTEMS AND METHODS FOR READING FLAT CARDS

CROSS-REFERENCE TO RELATED APPLICATIONS

The present application claims the benefit of U.S. Provisional Application 63/080,457 filed Sep. 18, 2020, which is incorporated herein by reference in its entirety.

BACKGROUND

Field of The Disclosure

The present disclosure relates to a system for scanning a card and identifying relevant information printed on the scanned card and more specifically to scanning and detecting characters printed on flat cards regardless of the design and format of the card and/or font, format and design with which characters are printed on the cards.

Description of the Related Art

Reliance on mobile devices for conducting various types of daily tasks has become ubiquitous. Such daily tasks include using mobile devices for transportation services, ordering food and grocery and/or any other type of e-commerce transaction. Other tasks can include using mobile devices as a replacement for physical cards to gain access to buildings, as a replacement for event tickets, etc. In all such cases, mobile devices need to be able to read information off of a physical card (e.g., a club membership card, a ticket, a payment instrument, etc.) in order to be capable of functioning as a replacement for those cards. For example, mobile applications that enable e-commerce transactions utilize various technologies to streamline their users' purchasing process by making it easier for their users to scan and use their credit card/financial instrument information for future use. One such technology is card.io that is an open source technology allowing users to use their device's camera to capture an image of their credit card/financial instrument to complete a transaction.

A challenge with card.io and other similar technologies is that due to variations in shapes and designs of such physical cards, not every card can be properly scanned and information thereon be read for use.

SUMMARY

To address the deficiencies in existing systems for scanning cards and reading pertinent information printed thereon, the present disclosure provides systems and methods that enable scanning of any type of card regardless of the shape and design of a given card and/or a font, a shape and a format with which characters such as numbers, letters and symbols are printed on the cards including cards with non-embossed characters printed thereon.

In one aspect, a method includes scanning a card, the card including at least an account number associated with a user of the card and an identifier of the user; detecting, by applying a machine learning model to the card after scanning the card, at least the account number printed on the card; and completing a task using the account number.

In another aspect, detecting the account number printed on the card includes identifying all characters printed on the card; reading all the characters to generate a string of characters; and applying the machine learning model to the string of characters to detect the account number.

In another aspect, the method further includes detecting, by applying the machine learning model, the identifier of the user in addition to the account number.

In another aspect, the account number and the identifier of the user are printed on the card using non-embossed characters.

In another aspect, the account number is detected regardless of (i) a font used for printing the account number on the card, (ii) a location on the card where the account is printed and (2) a format of printing the account number on the card.

In another aspect, the machine learning model utilizes an Optical Character Recognition engine for detecting the account number.

In another aspect, the task is completion of an electronic transaction being conducted using a mobile device used for scanning the card.

In another aspect, the task is storing the card in a virtual wallet on a mobile device used for scanning the card.

In another aspect, storing the card in the virtual wallet includes detecting, using the machine learning model, the account number, the identifier of the user and an issuer of the card; generating a virtual card using the account number, the identifier of the user and the issuer of the card; and storing the virtual card in the virtual wallet on the mobile device.

In another aspect, the card is one of a credit card, a debit card or a club membership card associated with the user.

In one aspect, a mobile device includes one or more memories having computer-readable instructions stored therein and one or more processors. The one or more processors are configured to execute the computer-readable instructions to scan a card, the card including at least an account number associated with a user of the card and an identifier of the user; detect, by applying a machine learning model to the card after scanning the card, at least the account number printed on the card; and complete a task using the account number.

In one aspect, one or more non-transitory computer-readable media include computer-readable instructions, which when executed by one or more processors of a mobile device, cause the mobile device to scan a card, the card including at least an account number associated with a user of the card and an identifier of the user; detect, by applying a machine learning model to the card after scanning the card, at least the account number printed on the card; and complete a task using the account number.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

As noted above, one or more example embodiments will be described below to address deficiencies in existing card scanning schemes such as card.io utilized by mobile and computer applications to scan information printed on a card and use the information to complete a transaction, create virtual cards and store them on their respective mobile/computer devices, etc. For example, existing schemes such as card.io may not be able to detect non-embossed fonts with which names, account numbers and/or other information (e.g., expiration date, security code, card issuer name) are printed on the face of a scanned card.

More specifically, example embodiments will be described below that utilize hard coded and/or machine learning techniques to scan any given card and detect certain information (e.g., card number, security code, name, etc.) regardless of the shape and format of the card and/or a font, a shape and a format with which characters such as numbers, letters and symbols are printed on the cards.

The disclosure begins with a description of an example architecture to be used for data processing according to the present disclosure.

Figure 1:
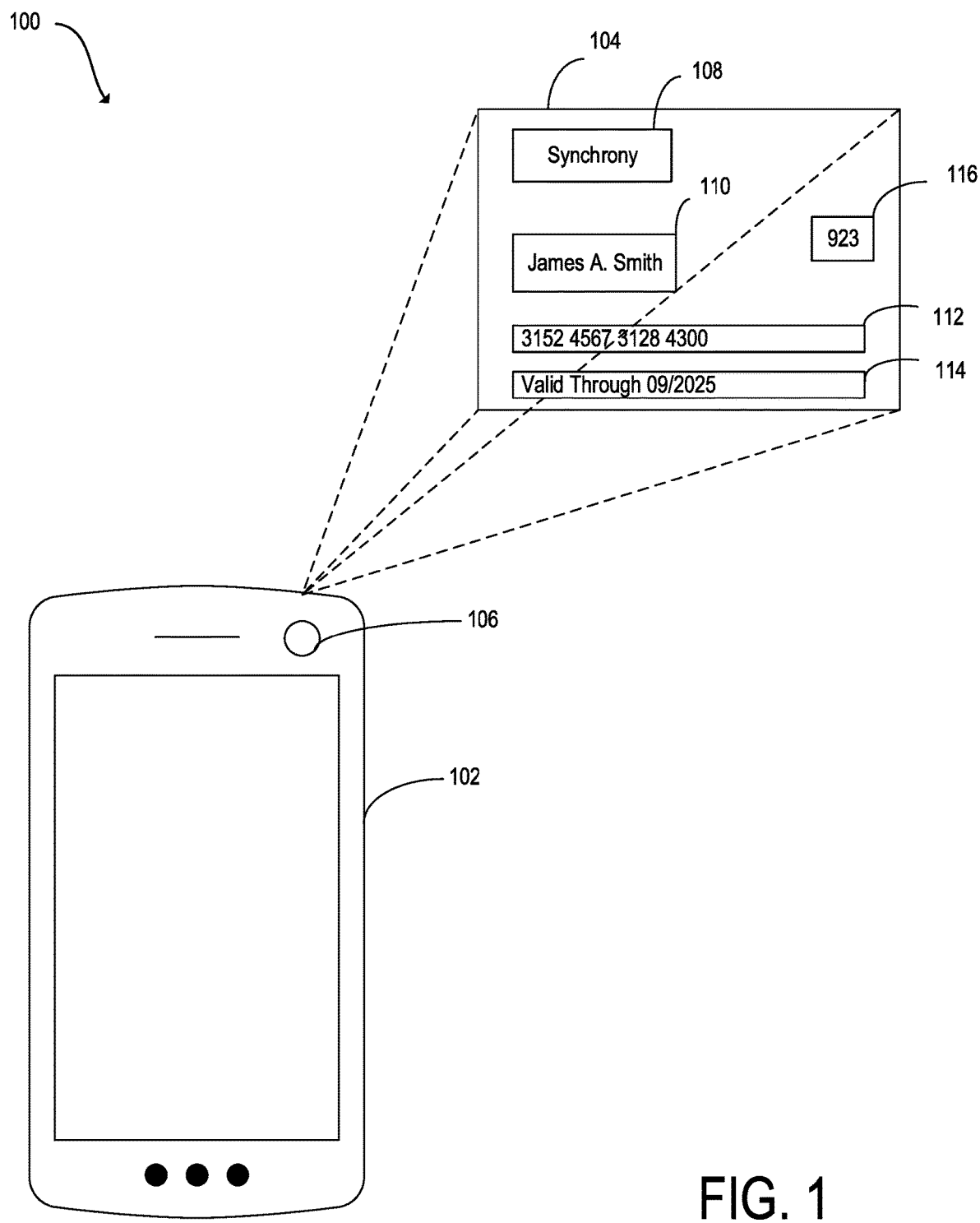
FIG. 1 illustrates an example setting in which the present disclosure may be utilized, according to an aspect of the present disclosure.

FIG. 1 illustrates an example setting in which the present disclosure may be utilized, according to an aspect of the present disclosure. Setting 100 of FIG. 1, includes an example mobile device 102 and a card 104.

Mobile device 102 can be any known or to be developed device that can scan a car (e.g., using a camera), detect information printed on the card and complete a task using the detected information. Such tasks can include generating a virtual card based on the detected information and/or using the detected information within an application installed on mobile device 102 to complete a transaction, gain access to a building, etc. For example, mobile device 102 can be a smart phone, a tablet, a laptop, etc.

Mobile device 102 may have one or more cameras 106. Such cameras may be positioned at various location on mobile device 102 such as back of mobile device 102 and/or front of mobile device 102 as shown in FIG. 1.

Card 104 can be any type of known or to be developed card made of any type of known or to be developed material (e.g., plastic, metal, magnetic material, etc.). Card 104 can have an electronic chip and/or a magnetic strip built therein that can include information for processing a transaction (contactless payment processing), gaining access to a secure area, etc. Card 104 can include various types of identifying information for a user associated with card 104. Examples of identifying information include, but are not limited to, a card issuer 108, a user name 110 of the user, an account number 112, an expiration date 114, a security code 116, etc. Such identifying information may be printed at any location on card 104 and may be embossed or non-embossed.

Examples of card 104 include, but are not limited to, a credit card, a debit card, a private label credit card associated with a particular brand or store, a conventional credit card (e.g., Master Card, Visa, American Express, etc.), a club membership card, a business card, a virtual access key for accessing a secure perimeter/area, etc.

FIG. 1 illustrates an example of using camera 106 of mobile device 102 to capture an image (implied using dashed lines in FIG. 1) of card 104.

Figure 2:
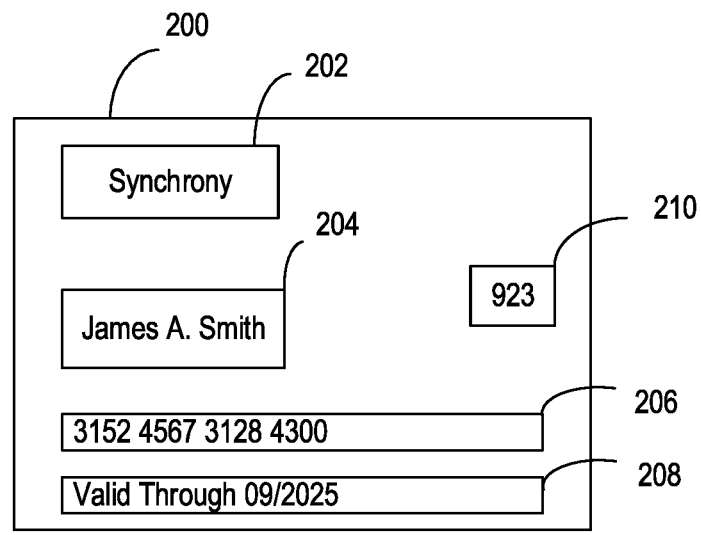
FIG. 2 describes example cards to be scanned, according to one aspect of the present disclosure.
Figure 2:
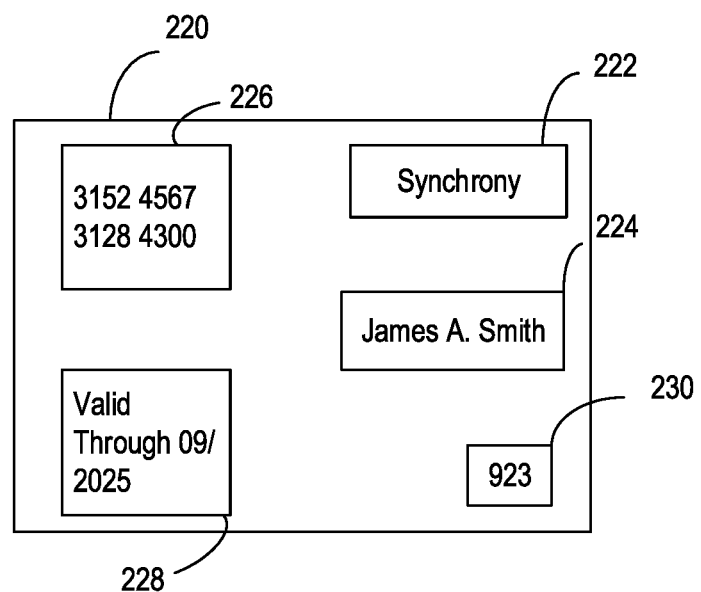

FIG. 2 describes example cards to be scanned, according to one aspect of the present disclosure. FIG. 2 illustrates two different and non-limiting examples of a card similar to card 104 of FIG. 1.

Card 200 may have an issuer 202 printed on the top left corner of card 200, a user name 204 of the owner/holder of card 200, an account/card number 206 and an expiration date 208 all printed horizontally beneath issuer 202 on the face of card 200. A card security code 210 may be printed on a front of card 200 or alternatively on the back of card 200. In on example, card issuer 202, user name 204, account/card number 206, expiration date 208 and/or card security code 210 may be printed on the face of card 200 using non-embossed fonts (flat fonts).

Card 220 is another example of a card that can be scanned using the present disclosure with pertinent information printed thereon in a different format compared to card 200. As shown, issuer 222 of card 220 may be printed on a top right corner of card 220. User name 224 of user/holder of card 220 may be printed beneath issuer 222. Account/card number 226 may be square shaped and printed, non-embossed, in the middle of card 220 (or alternatively at any other location on the face or back of card 220). Expiration date 228 and/or security code 230 may be printed at different location on card 220, as shown in FIG. 2.

While two example variations of how information may be printed on the face of a card 220 are shown in FIG. 2, any other form or type of card with varying fonts, shapes and formats of characters (e.g., embossed, non-embossed, etc.) used for printing identifying information on such cards also fall within the scope of the present disclosure.

As noted above, existing schemes for scanning and detecting various information on a scanned card are deficient in that they are unable to detect all types of information regardless of how they are presented on a scanned card. For example, identifying information printed in a non-embossed form on cards, cannot be properly detected using existing schemes. Furthermore, identifying information on cards with non-conventional print/format (e.g., card 220 of FIG. 2) may not be properly detected using existing schemes.

The present disclosure provides several examples of a scheme whereby any card can be scanned and information thereon be detected and used for a purpose (e.g., creating a virtual card for storage on mobile device 102, processing a transaction, accessing a secure perimeter such as a building, a car, etc.) regardless of the shape and design of a given card and/or a font, a shape and a format with which characters such as numbers, letters and symbols are printed on a given card. Such schemes may be software codes that can be installed and executed on mobile device 102. When a card is scanned using camera 106 of mobile device 102, the code may be executed to detect desired identifying information (e.g., one or more of user name 204, account/card number 206, expiration date 208 and/or security code 210).

In one example, a scheme may be hard coded to be able to identify a location at which a particular piece of identifying information is printed. For example, a scheme may be designed and hardcoded to look within a given location on a face of a card to extract account/card number of the card. In the instance of hardcoding the scheme, several classes of cards may be defined, each of which may follow a special format for printing identifying information on a card. For example, one class of cards may include account/card numbers that are 16 digits long and printed on a lower left corner of a card. Another class of cards may include account/card numbers that are 11 digits long and are printed close to lower edge of a card. Another example class of cards may include account/card numbers that are 15 digits long and may be square shaped and printed in a center of the card. Accordingly, a hardcoded scheme can look for 11, 15 or 16 consecutive digits at a particular location on a scanned card in order to detect the desired identifying information, which in this instance is the account/card number.

Hardcoding a card scanning and detection scheme as described above may limit the application and usability of such system as there can be not limit on variations in design of cards and the manner in with which identifying information are printed on such cards. Accordingly, the present disclosure also discloses a machine learning technique used for training a neural network to be able to scan and detect nearly all variations in card designs and printing of identifying information on such cards.

Figure 3:
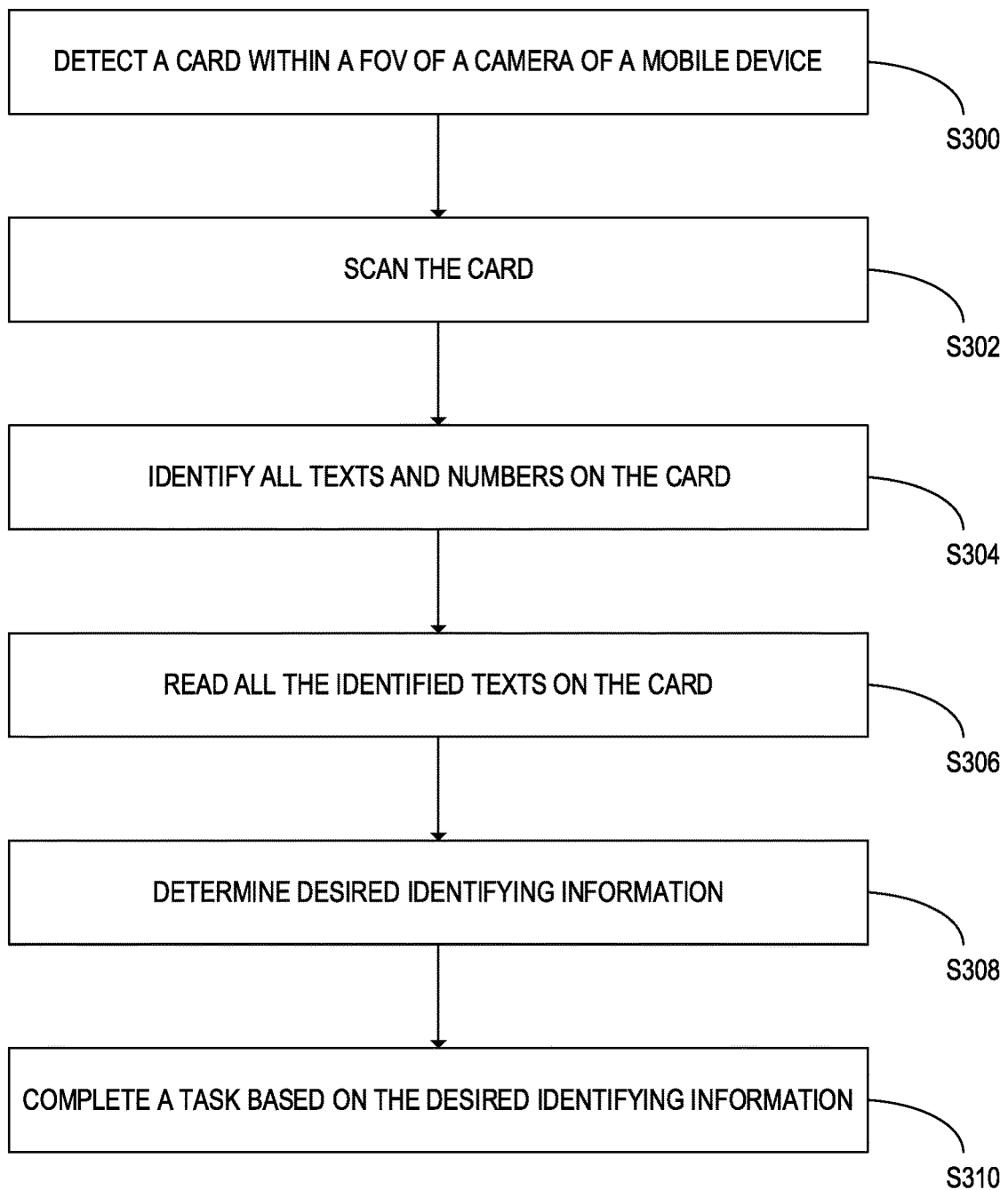
FIG. 3 describes a process for scanning a card and detecting identifying information on the scanned card, according to one aspect of the present disclosure.

FIG. 3 describes a process for scanning a card and detecting identifying information on the scanned card, according to one aspect of the present disclosure. FIG. 3 will be described from the perspective of mobile device 102. However, it should be understood that mobile device 102 may have one or more memories having computer-readable instructions stored thereon that correspond to advantage card scanning and detecting scheme of the present disclosure. The computer-readable instructions can be executed by one or more processors of mobile device 102 to implement the steps of FIG. 3 described below.

At S300, mobile device 102 detects the presence of a card within a Field of View (FoV) of camera 106. Detecting the presence of a card such as card 200 or card 220 can be based on any known or to be developed image recognition method utilized in mobile devices and smart phones.

At S302, mobile device 102 scans the card. Example card scanned at S302 may have the identifying information printed thereon in a non-embossed manner.

At S304, mobile device 102 identifies all texts, numbers, symbols (collectively referred to as characters) on the card scanned at S302. In implementing S304, mobile device 102 may implement a hardcoded process to identify Points of Interest (PoIs) on the scanned card or alternatively may implement a trained neural network to identify PoIs. PoIs may correspond to locations on a scanned card that include identifying information of the card.

In the hardcoded scheme example, font sizes, text formats, locations on the card surface on which the identifying information are printed are known to mobile device 102. Therefore, upon scanning an image of the card, mobile device 102 identifies all characters using the hardcoded font sizes, text formats and known locations on the card where the identifying information are printed.

In the trained neural network example, mobile 102 can identify PoIs on a scanned card regardless of the design of the card and/or format, shape and font used for printing the identifying information on the card. Training the neural network model will be further described below.

At S306 and upon identifying all characters on a scanned card, mobile device 102 reads all the identified characters. In one example, mobile device 102 can use any known or to be developed method for reading the characters including, but not limited to, an Optical Character Recognition (OCR) engine such as Tesseract. An OCR engine may perform gray scaling on the identified texts, thresholding to create grayscale images, binary conversion (white text on black background) and/or reverse conversion (black text on white back ground) in order to read the identified characters.

At S308, mobile device 102 determines desired identifying information (extract identifying information of interest) from the read characters. In one example, the desired identifying information can be determined using a hardcoded scheme. For instance, when the desired identifying information is account/card number, the hardcoded scheme can search for a string of consecutive digits (e.g., search for a string of 11 consecutive digits, 16 consecutive digits, etc.). In another example, the hardcoded scheme can search for a string of 4 or 6 digits with at least one "/" symbol in order to detect an expiration date.

In another example, the desired identifying information can be predicted using a trained neural network scheme. A neural network can be trained to identify information of interest in the read characters including, names, account/card numbers, expiration dates, etc.

In one example, when applying a trained neural network to extract desired identifying information, steps S304, S306 and S308 may be combined where the trained neural network model receives as input a scan of the card per S302 and provides as output desired identifying information (e.g., name of the cardholder, account/card number, expiration date, security code, etc.).

At S310, mobile device 102 completes a task based on the desired identifying information at S308. For example, such task may be completion of a transaction. In this instance, mobile device 102 populates payment information on a website or an application used on mobile device 102 with the desired identifying information (e.g., name of the cardholder, account/card number, expiration date, security code, etc.) in order to process/complete a transaction for which the card scanned at S302 is used.

In another example, the task may be creation of a virtual card and storage thereof on mobile device 102. In this instance, the desired identifying information (e.g., card issuer, user name, account/card number, expiration date, security code, etc.) determined at S308 may be used to create a virtual card corresponding to the card scanned at S302. Such card may then be stored in a digital wallet on mobile device 102.

Figure 4:
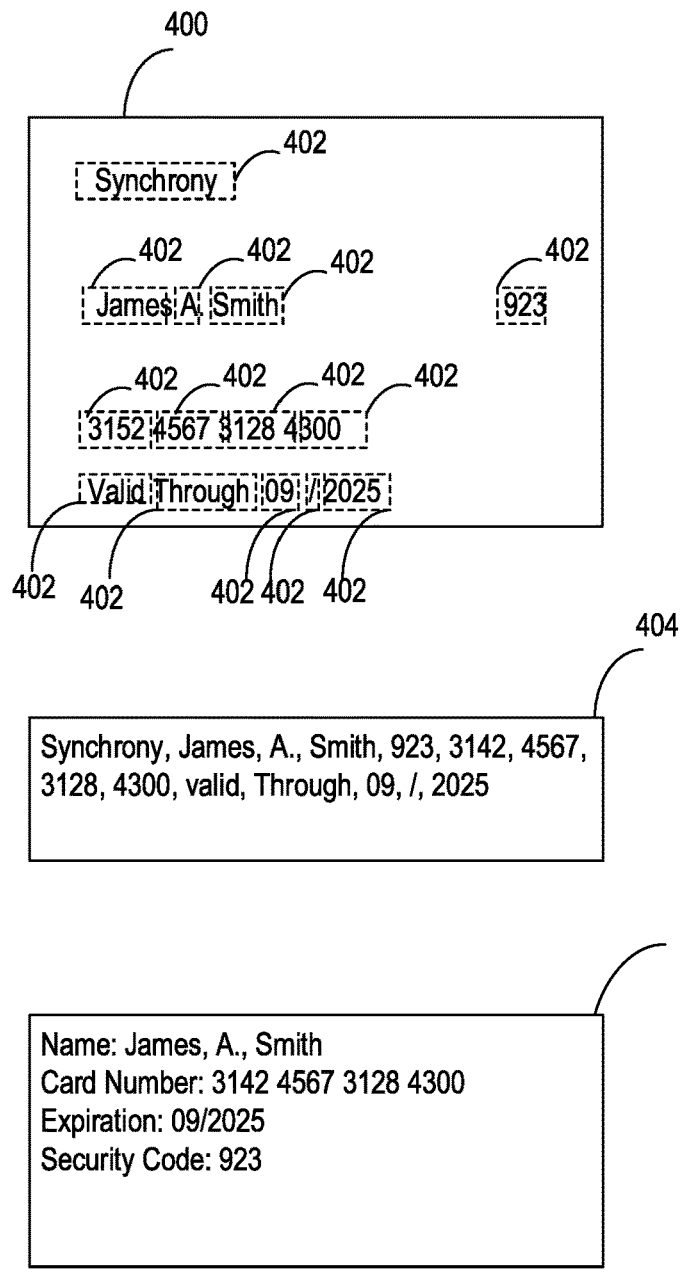
FIG. 4 illustrates outputs of various stage of the process of FIG. 3, according to one aspect of the present disclosure.

FIG. 4 illustrates outputs of various stage of the process of FIG. 3, according to one aspect of the present disclosure.

FIG. 4 illustrates a card 400 scanned at S302 and all characters printed thereon identified at S304. Card 400 may be the same as card 200 of FIG. 2. FIG. 4 illustrates dashed boxes 402 around each group of characters identified on the face of card 400 at S302.

FIG. 4 also illustrates read characters resulting from the process of reading all the identified characters at S306 described above. Output 404 provides a string of characters read by mobile device 102, separated using commas.

FIG. 4 also illustrates the results of extracting/determining desired identifying information from the string of read characters at S308. As can be seen from non-limiting example output 406, mobile device 102 can detect a user name, an account/card number of card 400, expiration date of card 400 and security code of card 400 as examples of desired identifying information.

As noted above, the processes of identifying characters, reading the identified characters and determining/extracting desired identifying information as performed per S304, S306 and S308 of FIG. 3 may be performed by a neural network trained using known or to be developed machine learning techniques.

A process of training a neural network using a machine learning technique will be described below with reference to FIG. 5.

Figure 5:
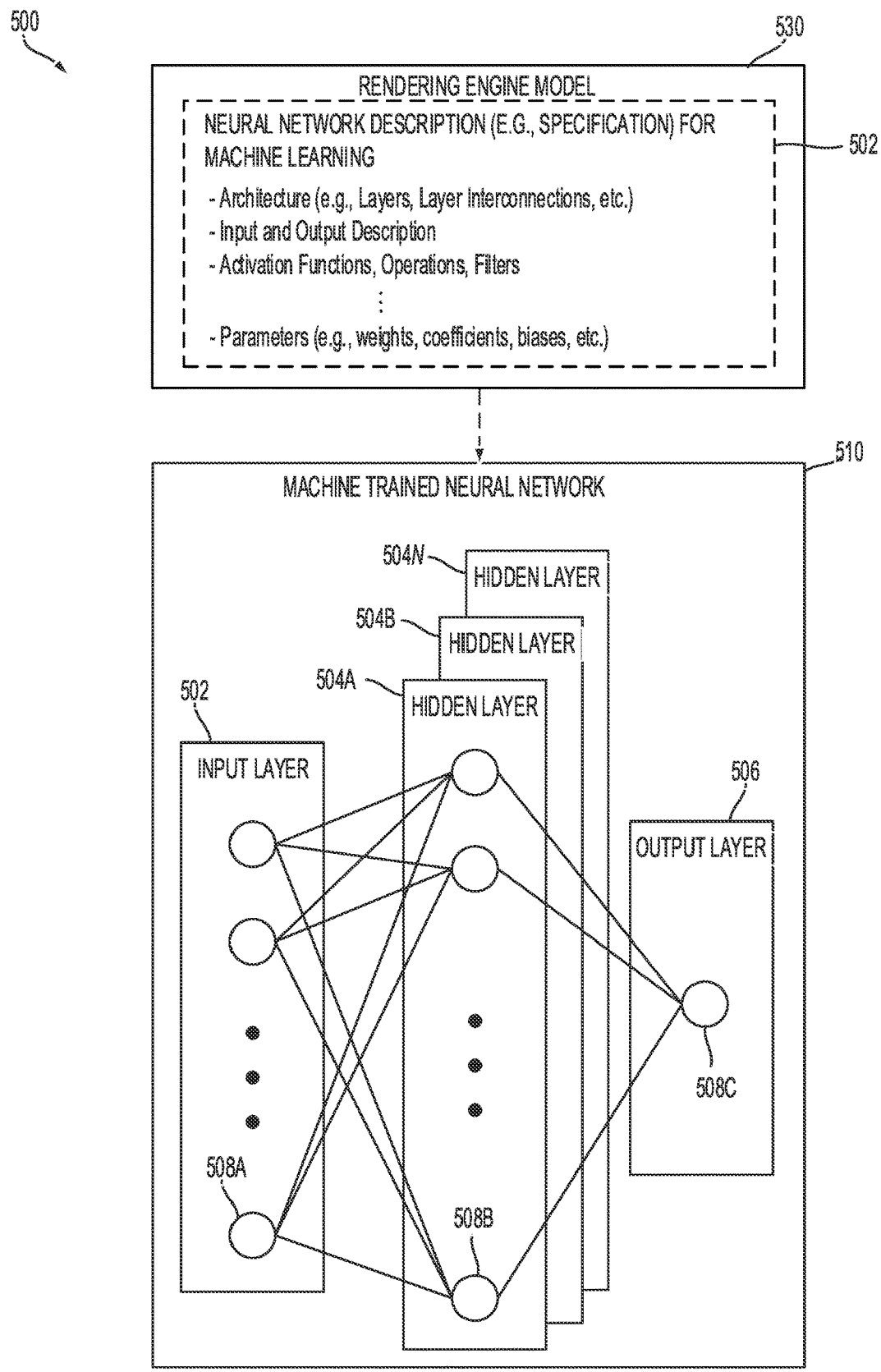
FIG. 5 illustrates a process of training a neural network for determining desired identifying information of a scanned card, according to one aspect of the present disclosure.

FIG. 5 illustrates a process of training a neural network for determining desired identifying information of a scanned card, according to one aspect of the present disclosure.

FIG. 5 illustrates an example neural architecture 500 of a neural network 510 defined by an example neural network description 502 for machine learning in neural controller 501 (controller 501, which can be the same as a processing unit inside mobile device 102, as will be described below with reference to FIG. 6). Neural network description 502 can include a full specification of neural network 510, including neural architecture 500. For example, neural network description 502 can include a description or specification of architecture of neural network 510 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc. and so forth. In one example, input description can include an image of a card and output description can be desired identifying information printed on the card, as described above. Various training and test data sets may be utilized to machine train neural network 510 such that once trained, neural network 510 can scan and detect nearly all variations in card designs and printing of identifying information on such cards.

Neural network 510 can reflect the architecture 500 defined in neural network description 502. In this non-limiting example, neural network 510 includes an input layer 503, which includes input data, which can be any type of data such as media content (images, videos, etc.), numbers, text, etc., of a scanned card such as example cards described above with reference to FIGS. 1-4. In one illustrative example, input layer 503 can include data representing a portion of the input media data, such as a patch of data or pixels (e.g., a 128×128 patch of data) in an image corresponding to the input media data.

Neural network 510 can include hidden layers 504A through 504N (collectively "504" hereinafter). Hidden layers 504 can include n number of hidden layers, where n is an integer greater than or equal to one. The number of hidden layers can include as many layers as needed for a desired processing outcome and/or rendering intent. Neural network 510 further includes an output layer 506 that provides an output resulting from the processing performed by hidden layers 504. In one illustrative example, output layer 506 can provide desired identifying information extracted from an image of a card scanned and provided as input to neural network 510.

Neural network 510, in this example, is a multi-layer neural network of interconnected nodes. Each node can represent a piece of information. Information associated with the nodes is shared among the different layers and each layer retains information as information is processed. In some cases, neural network 510 can include a feed-forward neural network, in which case there are no feedback connections where outputs of the neural network are fed back into itself. In other cases, neural network 510 can include a recurrent neural network, which can have loops that allow information to be carried across nodes while reading in input.

Information can be exchanged between nodes through node-to-node interconnections between the various layers. Nodes of input layer 503 can activate a set of nodes in the first hidden layer 504A. For example, as shown, each input node of input layer 503 is connected to each node of first hidden layer 504A. Nodes of hidden layer 504A can transform the information of each input node by applying activation functions to the information. The information derived from the transformation can then be passed to and can activate the nodes of the next hidden layer (e.g., 504B), which can perform their own designated functions. Example functions include convolutional, up-sampling, data transformation, pooling, and/or any other suitable functions. The output of hidden layer (e.g., 504B) can then activate nodes of the next hidden layer (e.g., 504/V), and so on. The output of last hidden layer can activate one or more nodes of output layer 506, at which point an output is provided. In some cases, while nodes (e.g., nodes 508A, 508B, 508C) in neural network 510 are shown as having multiple output lines, a node has a single output and all lines shown as being output from a node represent the same output value. In examples described with reference to scanning and determining desired identifying information from a scanned card, neural network 510, once trained, can have a single output that indicates desired identifying information or alternatively provides each desired identifying information as a separate output at output layer 506.

In some cases, each node or interconnection between nodes can have a weight that is a set of parameters derived from training neural network 510. For example, an interconnection between nodes can represent a piece of information learned about the interconnected nodes. The interconnection can have a numeric weight that can be tuned (e.g., based on a training dataset), allowing neural network 510 to be adaptive to inputs and able to learn as more data is processed.

Neural network 510 can be pre-trained to process the features from the data in input layer 503 using different hidden layers 504 in order to provide the output through the output layer 506. In the context of the present disclosure for scanning a card and detecting desired identifying information printed on the card regardless of the form or shape of the card and/or fonts, shapes and formats with which characters are printed on the card, neural network 510 may be trained as follows.

A large pool of various forms of cards (e.g., hundreds or thousands of different credit cards, debit cards, club membership cards, access cards, etc.) may be split into two classes of data called training data set and test data set. For example, 70% of the cards from the pool may be used as part of the training data set while the remaining 30% of the cards from the pool may be used as part of the test data set. The percentages according to which the pool of cards are split into training data set and test data set is not limited to 70/30 and may be set according to a configurable accuracy requirement and/or error tolerance (e.g., the split can be 50/50, 60/40, 70/30, 80/20, 90/10, etc. between the two data sets).

Cards in the training data set can then be used to train neural network 510 accompanied with manual feedback. With each scan and a resulting detection by neural network 510, manual feedback can be provided to correct the output of neural network 510, confirm the output of neural network 510, etc. As noted, weights of different nodes of neural network 510 may be adjusted/tuned during the training process to improve resulting output.

Once trained, neural network 510 can be tested using cards in test data set. Once the result of testing neural network 510 is satisfactory (e.g., when outputs of the testing stage is greater than or equal to a threshold or incorrect detections are less than a threshold), trained neural network 510 (which may also be referred to as a trained machine learning model or machine trained neural network) may be deployed for scanning cards and detecting desired identifying information printed on cards by implementing processes S304, S306 and S308 of FIG. 3. As noted, trained neural network 510 can detect desired identifying information on any card regardless of shape and design of the scanned card and/or a font, a shape and a format with which characters such as numbers, letters and symbols are printed on the scanned card (e.g., can detect non-embossed user names, account/card numbers, expiration dates, security codes, etc.).

In some cases, neural network 510 can adjust weights of nodes using a training process called backpropagation. Backpropagation can include a forward pass, a loss function, a backward pass, and a weight update. The forward pass, loss function, backward pass, and parameter update can be performed for one training iteration. The process can be repeated for a certain number of iterations for each set of training media data until the weights of the layers are accurately tuned.

For the example of rendering an image, the forward pass can include passing a training image through neural network 510. The weights can be initially randomized before neural network 510 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

Neural network 510 can include any suitable neural or deep learning type of network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 510 can represent any other neural or deep learning network, such as an autoencoder, a deep belief nets (DBNs), a recurrent neural networks (RNNs), etc.

Neural Architecture Search (NAS) involves a process in which neural controller 501 searches through various types of neural networks such as CNNs, DBNs, RNNs, etc., to determine which type of neural network, given the input/output description of neural network description 502, can perform closes to the desired output once trained. This search process is currently cumbersome and resource intensive, because every type of available neural network is treated as a "blackbox." In other words, a neural controller such as neural controller 501 selects an available neural network (a blackbox), trains it, validates it and either selects it or not depending on the validation result. However, each available example or type of neural network is a collection of nodes. As will be described below, the present disclosure enables gaining insight into performance of each individual node to assess its performance, which then allows the system to select of a hybrid structure of nodes that may or may not be the same as a given particular structure of a neural network currently available. In other words, the present disclosure enables an AutoML system to pick and choose nodes from different available neural networks and create a new structure that performs best for a given application.

With various examples of multi bot data processing described with reference to FIGS. 1-5, the disclosure now turns to example computing system that can be utilized to implement various card scanning and detection schemes for identifying information printed on the scanned card regardless of the design and form of the scanned card and/or shape, font and format with which identifying information are printed on the scanned card including, but not limited to, non-embossed texts, numbers and characters printed on the scanned card.

Figure 6:
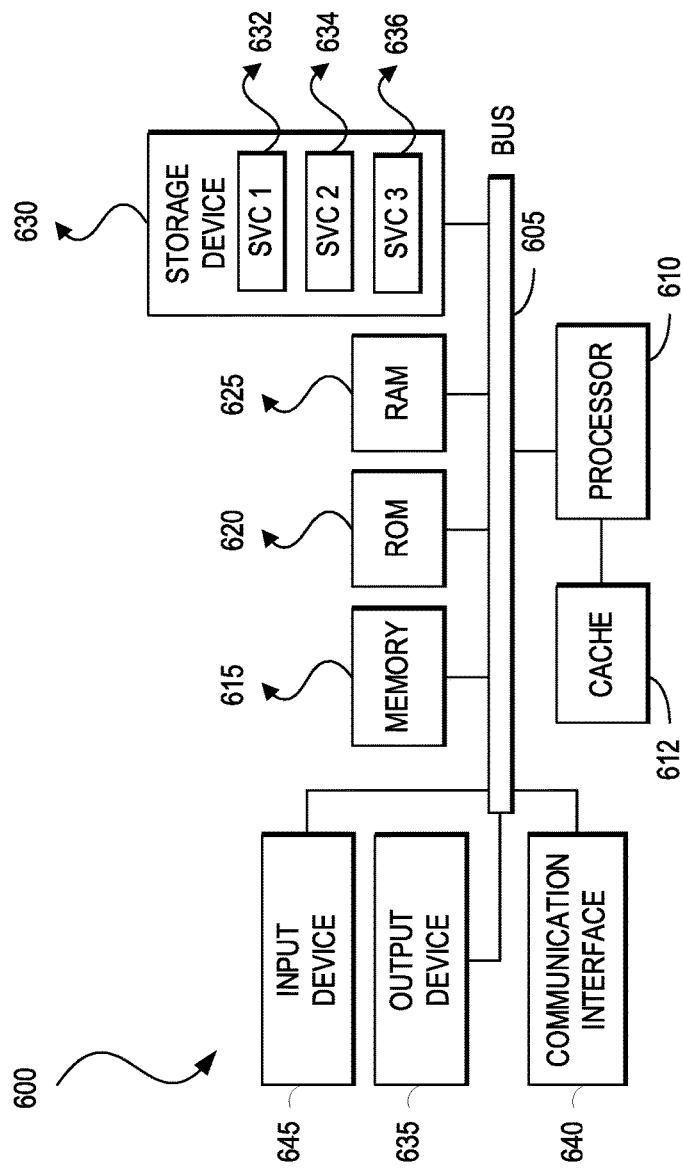
FIG. 6 illustrates an example computing system, according to one aspect of the present disclosure.

FIG. 6 illustrates an example computing system, according to one aspect of the present disclosure. FIG. 6 shows an example of computing system 600 with various components of it connected via connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the various embodiments may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

Like reference numbers and designations in the various drawings indicate like elements.

The disclosed secure and automated system for processing of time sensitive data can be performed using a computing server. An example computing server can include a processor (e.g., a central processing unit), memory, non-volatile memory, and an interface device. The memory may store data and/or and one or more code sets, software, scripts, etc. The components of the computer server can be coupled together via a bus or through some other known or convenient device. The processor may be configured to carry out all or part of methods described herein for example by executing code for example stored in memory. One or more of a user device or computer, a provider server or server, or a suspended database update server may include the components of the computing server or variations on such a server.

This disclosure contemplates the computer server taking any suitable physical form. As example and not by way of limitation, the computer server may be an embedded computer server, a server-on-chip (SOC), a single-board computer server (SBC) (such as, for example, a computer-on-module (COM) or server-on-module (SOM)), a desktop computer server, a laptop or notebook computer server, an interactive kiosk, a mainframe, a mesh of computer servers, a mobile telephone, a personal digital assistant (PDA), a server, or a combination of two or more of these. Where appropriate, the computer server may include one or more computer servers; be unitary or distributed; span multiple locations; span multiple machines; and/or reside in a cloud, which may include one or more cloud components in one or more networks. Where appropriate, one or more computer servers may perform without substantial spatial or temporal limitation one or more steps of one or more methods described or illustrated herein. As an example and not by way of limitation, one or more computer servers may perform in real time or in batch mode one or more steps of one or more methods described or illustrated herein. One or more computer servers may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because servers can be created with all applicable data available in memory. A typical computer server will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couples the processor to the network interface device. The interface can include one or more of a modem or network interface. It will be appreciated that a modem or network interface can be considered to be part of the computer server. The interface can include an analog modem, Integrated Services Digital network (ISDN0 modem, cable modem, token ring interface, satellite transmission interface (e.g., "direct PC"), or other interfaces for coupling a computer server to other computer servers. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer server can be controlled by operating server software that includes a file management server, such as a disk operating server. One example of operating server software with associated file management server software is the family of operating servers known as Windows® from Microsoft Corporation of Redmond, WA, and their associated file management servers. Another example of operating server software with its associated file management server software is the Linux™ operating server and its associated file management server. The file management server can be stored in the non-volatile memory and/or drive unit and can cause the processor to execute the various acts required by the operating server to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer server, or similar electronic computing device, that manipulates and transforms data represented as physical (electronic) quantities within registers and memories of the computer server into other data similarly represented as physical quantities within the computer server memories or registers or other such information storage, transmission or display devices.

The algorithms and displays presented herein are not inherently related to any particular computer or other apparatus. Various general purpose servers may be used with programs in accordance with the teachings herein, or it may prove convenient to construct more specialized apparatus to perform the methods of some examples. The required structure for a variety of these servers will appear from the description below. In addition, the techniques are not described with reference to any particular programming language, and various examples may thus be implemented using a variety of programming languages.

In various implementations, the server operates as a standalone device or may be connected (e.g., networked) to other servers. In a networked deployment, the server may operate in the capacity of a server or a client server in a client-server network environment, or as a peer server in a peer-to-peer (or distributed) network environment.

The server may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any server capable of executing a set of instructions (sequential or otherwise) that specify actions to be taken by that server.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the server and that cause the server to perform any one or more of the methodologies or modules of disclosed herein.

In general, the routines executed to implement the implementations of the disclosure, may be implemented as part of an operating server or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer servers, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a server, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ servers having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other servers, not necessarily the server described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the servers, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the server may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer server bus. Furthermore, any computing servers referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of servers and components for a contextual connection server. It will be understood by one of ordinary skill in the art, however, that the implementations described above may be practiced without these specific details. For example, circuits, servers, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing servers that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback server, a printer, and/or other types of output devices. A data storage device, such as a hard drive or flash memory, can enable the computing device to temporarily or permanently store data. A network interface, such as a wireless or wired interface, can enable the computing device to communicate with a network.

Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall server. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update server.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

Thus, particular embodiments of the invention have been described. Other embodiments are within the scope of the following claims. For example, the actions recited in the claims can be performed in a different order and still achieve desirable results.

What is claimed is:

1. A method comprising:
   scanning a card, the card including at least an account number associated with a user of the card and an identifier of the user;
   determining a type of card associated with the card, wherein the type of card is associated with a particular task, wherein determining the type of card includes applying a machine learning model to the card, wherein the machine learning model is trained using training images corresponding to a plurality of card types, and wherein the machine learning model enhances identification of card types that were previously limited by a hard coded scheme;
   identifying a set of characters printed on the card, wherein identifying the set of characters includes applying the machine learning model to the card;
   identifying a subset of characters that correspond to the account number, wherein the subset of characters is identified based on the type of card, and wherein identifying the subset of characters includes applying the machine learning model to distinguish the subset of characters from the set of characters;
   completing the particular task according to the subset of characters and the identifier of the user;

receiving feedback associated with the subset of characters and the type of card; and updating the machine learning model based on the feedback.

2. The method of claim 1, further comprising:

identifying another subset of characters that correspond to the identifier of the user, wherein identifying the other subset of characters includes applying the machine learning model to the set of characters.

3. The method of claim 1, wherein the account number and the identifier of the user are printed on the card using non-embossed characters.

4. The method of claim 1, wherein the subset of characters are identified regardless of (i) a font used for printing the account number on the card, (ii) a location on the card where the account number is printed, and (iii) a format of printing the account number on the card.

5. The method of claim 1, wherein the machine learning model utilizes an Optical Character Recognition to identify the set of characters.

6. The method of claim 1, wherein the particular task includes conducting an electronic transaction using a mobile device used for scanning the card.

7. The method of claim 1, wherein the particular task includes storing the card in a virtual wallet of a mobile device used for scanning the card.

8. The method of claim 7, wherein storing the card in the virtual wallet comprises:

detecting the account number, the identifier of the user and an issuer of the card, wherein the account number, the identifier of the user, and the issuer of the card are detected by applying the machine learning model to the set of characters;

generating a virtual card using the account number, the identifier of the user and the issuer of the card; and storing the virtual card in the virtual wallet of the mobile device.

9. The method of claim 1, wherein the card is one of a credit card, a debit card, or a club membership card associated with the user.

10. A mobile device comprising:

one or more memories having computer-readable instructions stored therein; and one or more processors configured to execute the computer-readable instructions to:

scan a card, the card including at least an account number associated with a user of the card and an identifier of the user;

determine a type of card associated with the card, wherein the type of card is associated with a particular task, wherein determining the type of card includes applying a machine learning model to the card, wherein the machine learning model is trained using training images corresponding to a plurality of card types, and wherein the machine learning model enhances identification of card types that were previously limited by a hard coded scheme;

identify a set of characters printed on the card, wherein identifying the set of characters includes applying the machine learning model to the card;

identify a subset of characters that correspond to the account number, wherein the subset of characters is identified based on the type of card, and wherein identifying the subset of characters includes applying the machine learning model to distinguish the subset of characters from the set of characters;

complete the particular task according to the subset of characters and the identifier of the user;

receive feedback associated with the subset of characters and the type of card; and update the machine learning model based on the feedback.

11. The mobile device of claim 10, wherein the one or more processors are configured to execute the computer-readable instructions to:

identify another subset of characters that correspond to the identifier of the user, wherein identifying the other subset of characters includes applying the machine learning model to the set of characters.

12. The mobile device of claim 10, wherein the account number and the identifier of the user are printed on the card using non-embossed characters.

13. The mobile device of claim 10, wherein the subset of characters are identified regardless of (i) a font used for printing the account number on the card, (ii) a location on the card where the account number is printed, and (iii) a format of printing the account number on the card.

14. The mobile device of claim 10, wherein the machine learning model utilizes an Optical Character Recognition to identify the set of characters.

15. The mobile device of claim 10, wherein the particular task includes conducting an electronic transaction using the mobile device.

16. The mobile device of claim 10, wherein the particular task includes storing the card in a virtual wallet of the mobile device.

17. The mobile device of claim 16, wherein the one or more processors are configured to execute the computer-readable instructions to:

detect the account number, the identifier of the user and an issuer of the card, wherein the account number, the identifier of the user, and the issuer of the card are detected by applying the machine learning model to the set of characters;

generate a virtual card using the account number, the identifier of the user and the issuer of the card; and storing the virtual card in the virtual wallet of the mobile device.

18. The mobile device of claim 10, wherein the card is one of a credit card, a debit card or a club membership card associated with the user.

* * * * *